Jan. 3, 1939.  L. J. NEWMAN  2,142,204
MULTIPOSITION REGULATOR
Filed July 19, 1935  2 Sheets-Sheet 1

INVENTOR
Louis J. Newman
BY
James & Franklin
ATTORNEYS

Jan. 3, 1939.  L. J. NEWMAN  2,142,204

MULTIPOSITION REGULATOR

Filed July 19, 1935  2 Sheets—Sheet 2

INVENTOR
Louis J. Newman
BY
James & Franklin
ATTORNEYS

Patented Jan. 3, 1939

2,142,204

UNITED STATES PATENT OFFICE 2,142,204

MULTIPOSITION REGULATOR

Louis J. Newman, New Rochelle, N. Y.

Application July 19, 1935, Serial No. 32,182

26 Claims. (Cl. 236—74)

This invention relates to regulators and more particularly to a multi-position regulator.

To regulate anything perfectly is to maintain its value at a set point, and the degree of regulation is the deviation of this value in either direction. Regulation involves the problem of combining in co-relation, first, a control instrument to detect a change in condition and, second, suitable apparatus set in operation by the instrument and serving to apply a corrective agency to maintain the condition within the limits set by the design of the equipment.

Because of inertia, there is a resistance to a change, which in practical application is indicated by the time required for a change. Thus we find that, in the regulation of a condition, the mass of the material and the rate of application of the correction have an important bearing on the response or the change of the condition. It is clear therefore, that synchronization between the controller and the source of correction, say a furnace in a heating system, can produce perfect regulation only if the inertia of the system is zero, which is not the case. Therefore, to operate properly, the controller must be out of synchronism with the source and there must be a time difference, which should increase with the increase in inertia value. Any attempt to synchronize the controller and source under these conditions will result in over and under runs. Proper timing is therefore an important factor. Particularly in a heating system it takes an appreciable time for the fuel to produce heat, time for the heat to be distributed, time for the heat to affect the space to be heated, and time for the heat of the air to affect the controller. Therefore, if the controller is made to operate the draft of the furnace, the result obtained will depend entirely on the inertia of the system and will cause the amount of deviation from the differential at which the instrument is set to vary to the extent of such inertia if proper time allowance is not made. The time required for a change in condition to cause the combination of equipment to function to correct such change is the lag, and the amount of deviation from the set limits of the control instrument caused by the lag may be called hunting.

Any system has a definite cycle of operation depending on the time functions of the various component factors of the system. Where these factors are variable over a wide range, as they usually are, due to variations in demand, the capacity of the source, or other condition, the cycle of operation in any given system will vary. While the phase relation of the regulator system may remain proportional to the time in a cycle, the value of the lag will vary with the change in cycle. Therefore, any attempt to control the condition of a medium by a fixed time relation between controller and source, is only effective when the factors are favorable to produce a cycle of operation where the lag is equal to the fixed time relation mentioned above.

The curve of the cycle of operation showing the value of the condition of the medium is a measure of the degree of regulation. The slope of any portion of such curve is proportional to the rate at which its value is changing. It is this rate which governs the degree with which the regulation can be maintained within proper limits. The regulation of this rate is a function of the controller action, the phase relation of such action with the action of the source, and the value of corrective production by the source. Reducing the differential of the controller tends to shorten the time period of a cycle and, also, reduce the amplitude of the curve but it does not reduce the amplitude proportionately where the lag is appreciable. There are several systems in use which employ an artificial time lag or a means of changing the range of the differential to provide an anticipating effect between the controller and the source. This again is effective only to the extent that it matches the lag in the system.

The conventional "on and off" regulator operates with a controller set for a given differential, and is arranged to change the source to either its minimum or maximum positions only when the condition of the medium reaches a value at either end of the said differential. Assume that the last action of the controller has occurred at "low" value. The source is changed to its maximum or "open" position, for maximum production or correction, and it will continue thus until the value of the condition of the medium has increased an amount equal to the controller differential, before the action of the controller at the "high" value changes the source to the minimum or "closed" position, thereby shutting down production. Thus it is seen that once the source is "open" no action can take place to change the production unless the change in the medium passes through the value represented by the differential from "low" to "high" at the controller, and vice versa, once the source is "closed" no action can take place unless the measured condition changes from "high" to "low". Where the lag is appreciable, the rate of production tends to increase during the period of "open" setting at the source, and, when the "high" limit of the controller differential is reached, the slope of the curve is at a maximum, causing a continuation of the increase even after the source has been "closed", and this continues until the slope starts a downward trend. This time, the change in condition to cause another operation must pass from the highest point which was finally reached, which may be considerably above the controller "high", to "low", with the result of again having an excessive rate change, but this time in a negative direction, tending to cause a change considerably below "low".

The object of the invention is to provide a new system of regulation of the condition of a medium by controlling the production, rate of flow or periods of operation of an agency which affects the condition of the medium and where, due to the mass of the medium, there is a tendency to produce excessive hunting by ordinary methods. The intention is to provide an inherent out of phase relation between the change in the condition of the medium and the operation of the agency producing the effect for correcting the change in condition above mentioned.

This invention relates to regulating means for the operation of apparatus to affect the positioning of such apparatus for the purpose of controlling the condition of a medium between the two limits of setting of the control instrument, and also to obtain one or more additional positions of the apparatus intermediate between the two extremes. The controlled condition of the medium may be a temperature, pressure, flow, motion, or any condition which can be translated or measured. The medium may be a mass of material such as a gas, a liquid or a solid. The controlling force may be electric, pneumatic, hydraulic, or any means which can be operated by the opening or closing of contacts or the operation of valves, or mechanical trips, or a conbination of these means.

For the purpose of illustration, the controlled condition is shown as a temperature and the controlling force is an electric circuit. The controlling instrument in this case is a thermostat with a movable member responsive to a temperature change, with two fixed contacts, the movable member making contact with either one of the fixed contacts for a temperature change between the limits of the setting of the instrument. The intermediate controlling device is in the form of a relay which moves a switch in a manner to obtain three or more positions in proper sequence depending on the sequence of operation of the controlling instrument. In the illustration of temperature regulation, the thermostat is arranged to control an electric motor which in turn can be made to regulate the production of heat by the operation of the position of a damper, or by the flow of steam by means of the operation of a valve to different openings, or by the period of time of opening or closing of the ignition device of an oil burner. The motor can be of the uni-directional type, reversing type or spring return type.

In accordance with a more specific object of my invention, the relay mentioned above is interposed between the thermostat and the motor, and the combination functions to obtain different degrees of setting of the apparatus. Assume that it is the purpose to regulate the temperature of a room by adjustment of the dampers of a furnace, and that the thermostat is arranged to open the dampers full when contact is made on the side indicating that heat is called for, and similarly, that the thermostat closes down the dampers full when contact is made on the other side. With my invention, the moment the thermostat circuit opens, the relay functions in such a manner as to cause an operation of the motor to produce an intermediate setting of the dampers, the amount of opening depending on the direction in which the thermostat had previously made contact.

My regulator system differs from the "on and off" principle in the following manner. If the value of the condition of the medium is above "high" and a downward change is occurring, as soon as this change reaches or passes the value of "high", an action takes place to set the source at an intermediate open position which starts production to a moderate degree. Due to the lag, the change in condition keeps going down, but because of the start in production, the slope of the curve is decreased, thus checking the rate of change. If production is not sufficient, and the change continues to "low", an action takes place to set the source at "open" but, due to the reduced slope, the change in opposite direction is quicker, and, when the curve passes the low point again on the way up, an action again occurs setting the source at another intermediate open position, this time checking production and tending to change the slope of the rising curve. The result is a tendency to keep the curve within the values of "high" and "low" of the differential with slight runs above or below, and frequently in a parallel position for considerable periods.

An effect of this regulator is to operate so that the controller becomes a two range instrument at times. When below the high point, and the high intermediate setting of the source is enough to correct the condition to bring it back to "high", the source is set alternately at closed and intermediate as the value of the change in condition rises above or falls back below the high point. A similar result occurs at the low point, when the low intermediate setting is not enough to correct the condition to prevent it falling back to "low".

In accordance with further features and objects of my invention, I disclose several embodiments of the invention which are characterized in common by the movement of a switch block by means of solenoids on the closing of one of the circuits of the thermostat. The switch block has mounted on it a suitable switch for operating a damper motor or the like. This switch is arranged to be operated by cam mechanism on a shaft which is mechanically coupled to the damper motor or any part of the apparatus having a movement proportional to that of the damper motor or dampers. The cam mechanism includes a plurality of cams each arranged to leave the damper in a different position and to thereby serve as a limiting device for the amount of movement of the damper motor.

To the accomplishment of the foregoing and other objects which will hereinafter appear, my invention consists in the multi-position regulator elements and their relation one to the other as hereinafter are more particularly described in the specification and sought to be defined in the claims. The specification is accompanied by drawings in which:

Figure 3:
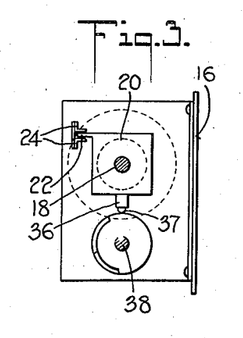
Fig. 3 is a section in the plane of the line 3—3 of Fig. 2.
Figure 4:
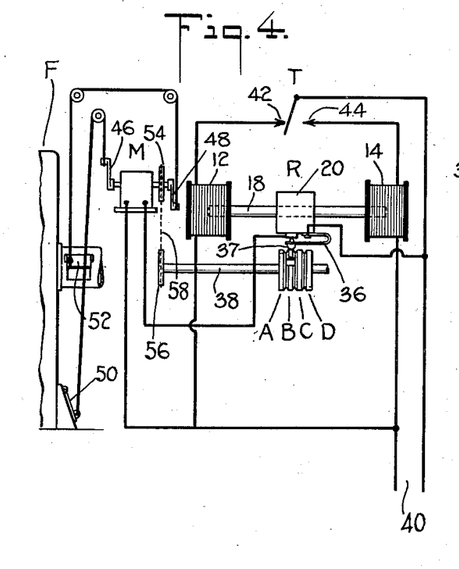
Fig. 4 is a schematic diagram of a regulator system including the aforesaid relay.

Referring to the drawings, and more particularly to Fig. 4, the regulator system there shown comprises a control instrument T responsive to a condition to be regulated, corrective apparatus F for varying the condition, and a multi-position relay R connected between the control instrument T and the corrective apparatus F in order to obtain a plurality of different corrective positions. As here exemplified, the control instrument T is a thermostat, the corrective apparatus F is a furnace for supplying heat, and there is associated with the furnace F a damper motor M for changing the positions of the furnace dampers. While the thermostat T is a two-position device, the relay R is a four-position device making possible four adjustments of the furnace dampers. The manner in which this is accomplished requires a more detailed description of the relay R, and this will be given with reference to Figs. 1, 2 and 3 of the drawings.

The relay comprises solenoids 12 and 14 mounted in spaced coaxial relation on a suitable base or wall plate 16. A core 18 is axially movable in solenoids 12 and 14, the core being drawn to one extreme position when solenoid 12 is energized and to the opposite extreme position when solenoid 14 is energized. A switch block 20 is loosely mounted on core 18 but is prevented from rotating about the core by an arm 22 slidable between guide rails 24, as is best shown in Fig. 3. Collars 26 and 28 are mounted on core 18 at either side of switch block 20, these collars being secured in place by appropriate set screws. It will be noted that the collars are spaced apart a distance greater than the width of the switch block, thereby providing lost motion between the collars and the switch block. When either solenoid is energized, the core is moved to one extreme position, this position being determined by the collars 26 and 28. During the movement of the core, the slack or lost motion is taken up and the switch block is thereupon moved to its extreme position. When the solenoid is de-energized, the core and with it the switch block, are moved to an intermediate position by automatic restoring means here exemplified by compression springs 30 and 32 preferably concealed in cylindrical housings 34. Because of the lost motion between the collars 26 and 28, it will be evident that there are two intermediate positions of the switch block, although there is only one intermediate position of the core. The switch block is moved to that intermediate position nearest the extreme position last used.

Switch block 20 carries a switch 36 here exemplified as a simple form of single pole switch comprising a bent leaf spring carrying a lower contact and movable upwardly into engagement with a fixed upper contact mounted on the switch block. The switch cooperates with cam mechanism here exemplified by four cams A, B, C and D, mounted on a cam shaft 38 extending in the direction of movement of the switch block. The side edges or corners of the cams are sloped or chamfered to facilitate movement thereover of a cam follower 37 mounted beneath the switch spring 36. It will be evident that the operation of switch 36 is dependent on relative movement of the switch block and the cam mechanism, this movement being of two kinds, an axial movement of the switch block, and a rotative movement of the cam mechanism.

Reverting now to Fig. 4, electrical energy is supplied through a suitable supply line 40, which may be a regular house lighting circuit. Movement of the thermostat to contact 42 causes energization of solenoid 12, while movement of the thermostat to contact 44 causes energization of solenoid 14. These respectively cause movement of switch block 20 to positions over cams A or D. The resulting closing of switch 36 causes energy from supply line 40 to be fed to damper motor M, which in the present case is illustrated as a uni-directionally rotatable motor. (A reversing motor may be used with appropriate changes in the switch system on the switch block.) The resulting movement of crank arms 46 and 48 causes simultaneous and opposite movement of lower and upper dampers 50 and 52.

To stop the damper motor when the dampers have been moved to desired positions, I connect the dampers or the damper motor in any suitable manner to the cam shaft 38. In the present case I provide a sprocket gear 54 on the motor shaft and a similar sprocket gear 56 on the cam shaft, these gears being connected by a suitable chain 58. It will be manifest that with this arrangement the cams rotate in unison with the damper motor and the cam position is responsive to and is itself an indication of the damper position.

Figure 5:
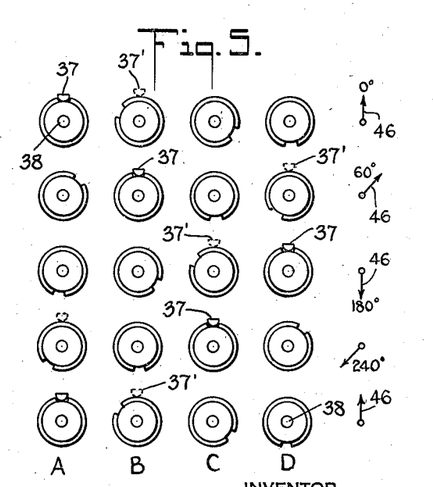
Fig. 5 is a cam diagram explanatory of the invention.

The operation of the regulator system may be explained with further reference to Fig. 5 of the drawings. For convenience I shall refer to the damper operation in terms of the damper 50, this being fully shut when the temperature is too high, thereby causing the thermostat to close contact 42 and to move the switch block over cam A. As is indicated at the top left corner of Fig. 5, cam A is cut away or has a low point which reaches cam follower 37 when the motor arm 46 is in upright or 0° position, as is indicated at the top right portion of Fig. 5. It should be understood that when the temperature is too high and solenoid 12 is energized, the switch block is moved over a high part of cam A, thereby closing the motor circuit until the motor moves to the position shown in Fig. 4 and at the top line of Fig. 5. The cam follower 37 then drops in the low part of the cam, thereby opening the motor circuit. The damper remains in fully shut position. When the temperature lowers slightly, so that the thermostat just leaves contact 42, solenoid 12 is de-energized and restoring spring 30 automatically moves the switch block 20 from its position over cam A to a position over cam B. In other words, cam follower 37 is moved from the solid position to the dotted position 37' in the top line of Fig. 5. This closes the motor circuit and the motor moves to partially open the damper. This movement is arrested when the low point of cam B reaches cam follower 37, as is clearly shown in the second line of Fig. 5. The intermediate position now assumed by the damper may be adjusted as desired and depends, of course, on the position of the depression in cam B. As here exemplified, the damper arm 46 assumes the intermediate position shown in the second line of Fig. 5, this position being about 60° away from the fully shut position.

This correction of the damper position of course long anticipates actual movement of the thermostat all the way from contact 42 to contact 44. In many cases the intermediate position will raise the temperature sufficiently to again cause engagement by the thermostat of contact 42, in which case solenoid 12 is energized, switch block 20 is moved over cam A, and the damper motor is rotated until the damper is again fully shut. In other words, if the optimum damper adjustment for maintenance of constant temperature happens to lie between the fully shut position and the adjacent intermediate position, the regulator will simply oscillate between these two positions. The resulting regulation is of course closer and superior to the crude regulation which would be obtainable from a simple two-position device.

If the partial opening of the damper is inadequate to maintain the desired temperature (as if the weather changes to colder condition) the thermostat moves over until contact 44 is engaged, thereby energizing solenoid 14 and pulling the switch block over cam D. The result is indicated by the change from the solid line position of cam follower 37 to the dotted line position 37', shown in the second line of Fig. 5. This closes the motor circuit and the motor moves until the low part of cam D reaches cam follower 37 as is shown in the third line of Fig. 5. At this time the damper is fully opened, the control arm 46 being in the down or 180° position shown in Fig. 5. Ordinarily the resulting full capacity condition of the furnace will bring the temperature up, but the moment the temperature rises sufficiently for the thermostat to leave contact 44, the switch cam follower 37 is moved from cam D to cam C, as is indicated by the dotted line position in the third line of Fig. 5. This of course energizes the damper motor and changes the damper to an intermediate position, in which the damper is partially closed. This position may be selected as desired and depends upon the location of the low point of cam C.

As here illustrated the damper position corresponds to the position of control arm 46 at 240° as is indicated in the fourth line of Fig. 5. If the optimum damper adjustment for the state of the weather and similar factors is between the fully opened position and the adjacent intermediate position, the relay will be moved at intervals between cams C and D. If, however, the temperature should become too high, the thermostat will engage contact 42 and the cam follower 37 will be moved to a position over cam A, as is indicated by the dotted showing in the fourth line of Fig. 5. In that case the damper motor is energized and operates until the damper reaches the fully closed position, as is indicated in the fifth line of Fig. 5.

While I have shown a four-position regulator, the manner in which a three-position regulator may be constructed will be evident, it being merely necessary to eliminate the lost motion between the collars 26 and 28 and the switch block 20 and to substitute a single intermediate cam for the two intermediate cams. With this arrangement only one intermediate damper position is obtainable and the control will normally fluctuate between the intermediate position and one of the extreme positions.

Figure 6:
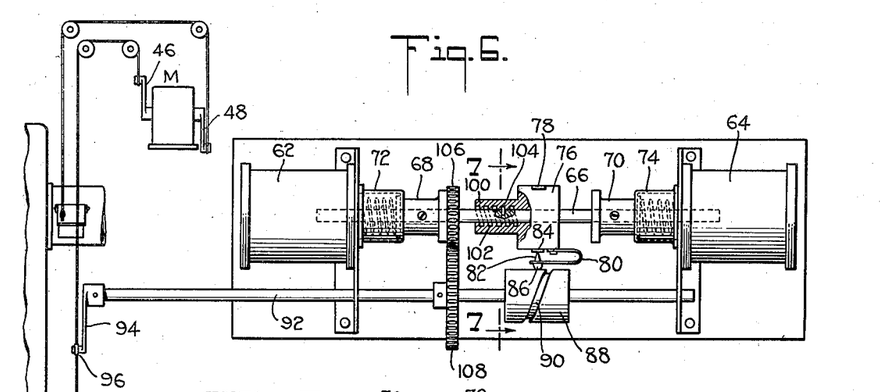
Fig. 6 is a partially schematic elevation of a system modified for an indefinite number of positions.
Figure 7:
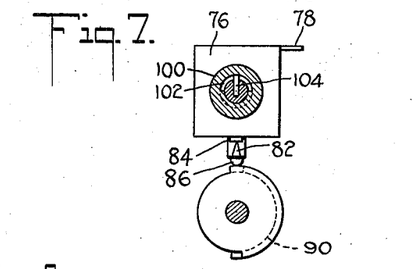
Fig. 7 is a section taken in the plane of the line 7—7 of Fig. 6.

It is also possible to effectively increase the number of intermediate positions to theoretically an infinite number of positions affording exact adjustment of the damper system. A modified arrangement for this purpose is illustrated in Fig. 6 of the drawings (without the thermostat and electric wiring which is the same as in Fig. 4). Referring to Fig. 6, the relay comprises solenoids 62 and 64 adapted to reciprocate a core 66 between extreme or end positions determined by collars 68 and 70 which act as motion-limiting stops for the core. Compression springs are carried within spring housings 72 and 74 just as previously described, these springs bearing against the outer ends of collars 68 and 70, and operating to normally move the core to a single intermediate position. The core carries a switch block 76 rotation of which is prevented by an arm 78 just as previously described. The switch block carries a switch 80, the lower contact 82 of which is adapted to be moved upwardly into engagement with an upper contact 84 by means of a cam follower 86 just as previously described. Cam follower 86 cooperates with a cam 88, the cut away or low portion of which is in the form of a continuous helix 90.

Cam 88 is mounted on a cam shaft 92 which is operatively connected to the damper system. In the present case cam 88 is intended for oscillation or partial rotation rather than for complete rotation in one direction. The cam shaft is accordingly provided with a crank arm 94, the crank pin 96 of which is connected to one of the damper cords. Crank arm 94 is longer than the arms 46 and 48 of damper motor M. The damper motor may accordingly be a uni-directionally operated motor just as heretofore described, whereas cam shaft 92 is oscillated between extreme positions less than 180° apart.

As so far described, the arrangement will function as a three-position relay. When the thermostat contacts at one extreme position, one of the solenoids is energized and the switch block is moved to one side, thereupon moving the cam follower 86 from the low portion 90 to the high surface of cam 88. The damper motor circuit is thereby closed and the damper position changed until the low portion 90 of the cam reaches the cam follower 86. Only three points of the cam track 90 would be effective, these points corresponding to the extreme and intermediate positions of the switch block.

However, in the present case the switch block 76 is adjustably rather than fixedly mounted on core 66. Specifically, the switch block 76 is provided with a bushing 100 carrying an internal thread 102. Core 66 is fitted with a pin 104 which projects into thread 102. The core is rotatable relative to the switch block, the desired rotation being provided by a gear 106 mounted on the core and meshing with a gear 108 mounted on cam shaft 92. These gears are in mesh when the core is in intermediate position but are disengaged when the core is moved to either extreme position by the action of the solenoids.

At the beginning, the switch block is centrally located with respect to core 66, or in other words, the single intermediate position provided by the relay is half-way between the end positions. When a solenoid is energized and the switch block is moved from intermediate to end position, the gears 106 and 108 are disengaged. The operation is therefore just as previously described, the damper system being fully shut or fully opened until the thermostat just leaves its contact. The switch block is thereupon restored by the opposed compression springs to intermediate position, and incidentally the gears 106 and 108 are brought into mesh. The ends of the gear teeth are tapered to facilitate engagement. The damper system is thereupon moved to intermediate position. During this movement gear 108 rotates gear 106, and pin 104 moving in thread 102 shifts the position of switch block 76 relative to core 66. This movement is in the direction toward the extreme position last used. As a result of this movement the dampers assume a new intermediate position which is nearer the end position. Under normal conditions this first correction may not be sufficient to reach the optimum steady state damper position in which case the thermostat will again contact and again move the switch block to end position and the gears out of mesh. When the thermostat contact opens the core is spring-restored to intermediate position and the gears engaged. The damper motion again operates to bring the dampers to intermediate position, but the intermediate position now assumed is another step nearer the end position last used. In this manner, by successive steps, the damper system is brought to a correct steady state position. This assumes of course that factors such as the weather, window opening and fire condition have not substantially changed. If these factors change, the thermostat may be brought to its opposite contact, in which case the process begins again with the intermediate position progressively moved toward the opposite end position until a new desirable equilibrium is established.

Figure 1:
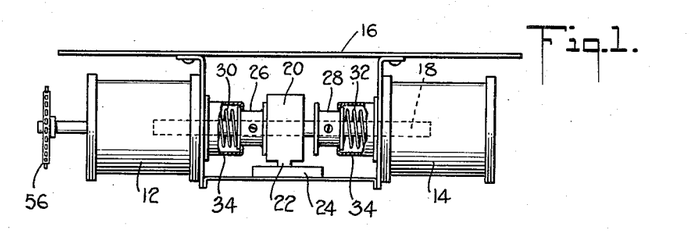
Fig. 1 is a plan view of a four-position relay embodying features of my invention.
Figure 2:
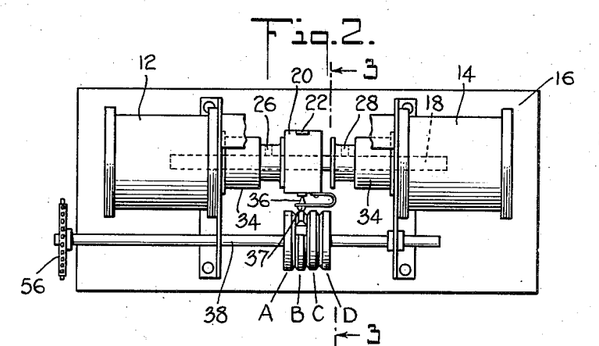
Fig. 2 is a front elevation thereof.
Figures 8, 9:
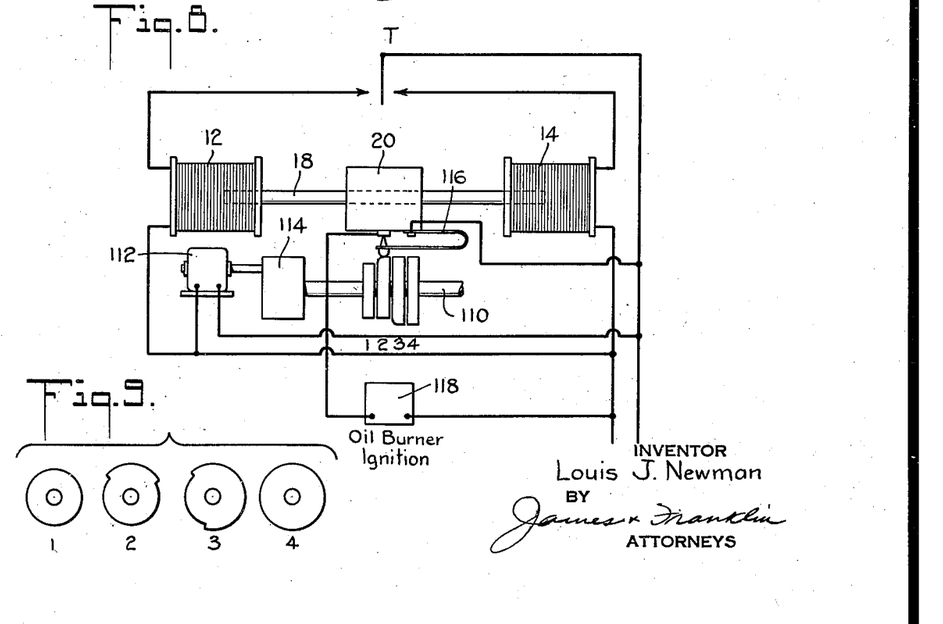
Fig. 8 is a schematic diagram of still another form of regulator system for producing varying time periods.
Fig. 9 shows the cams used in the system of Fig. 8.

The multiple-position relay system of my invention may be applied to vary time periods rather than the position of a control element. For example, when dealing with an oil burner, the best practice is to use the burner at a steady flame value and to vary the time during which the burner is ignited rather than to attempt to vary the intensity of the burner flame. An arrangement for this purpose is schematically illustrated in Fig. 8 of the drawings, which is to be taken in conjunction with Figs. 1, 2 and 3 showing the mechanical arrangement of the relay. In Fig. 8, as in Fig. 4, there is a two-position thermostat responsive to temperature and controlling the energization of relays 12 and 14. These in turn move core 18 to either extreme position, and, through a lost motion collar and compression spring arrangement just as heretofore described, the switch block 20 is moved to any of four positions corresponding to any of four cams marked 1, 2, 3 and 4. These cams are mounted on a rotatable cam shaft 110 which is continuously rotated at slow speed by a suitable timing device here exemplified by a small electric motor 112. Speed-reducing mechanism in gear box 114 brings the rotation of cam shaft 110 down to a suitable low value, say one revolution in fifteen minutes. Switch 116 is like those heretofore described, but is connected in circuit with a suitable oil burner ignition system schematically indicated at 118. It will be understood that whenever switch 116 is closed the oil burner is ignited and the blower motor simultaneously started. When switch 116 is opened, the oil burner is extinguished.

Cams 1, 2, 3 and 4 are shown in profile in Fig. 9. It will be noted that cam 1 is entirely of small radius, cam 2 is elevated for about one-third its periphery, cam 3 is elevated for about two-thirds of its periphery, and cam 4 is entirely at large radius. With this arrangement when the room temperature is too high and the switch block is moved over cam 1, the oil burner is not ignited. When the thermostat contact opens, the switch block is automatically moved by the opposed compression springs of the relay to the intermediate position over cam 2 at which time the burner is ignited for five minutes and extinguished for ten minutes in each fifteen minute period. If the weather changes to extreme cold and the opposite thermostat contact is closed, the switch block is moved to a position over cam 4, at which time the burner runs continuously. When there is some gain in temperature sufficient for the thermostat to leave this contact, the switch block is automatically restored to an intermediate position over cam 3, at which time the burner is ignited for ten minutes in each fifteen minute period.

It will be understood that the time proportions employed in the several cams may be varied as experience with a particular installation may dictate. The indicated time periods of five and ten minutes in a fifteen-minute cycle are merely illustrative. It will also be understood that the system will often change or shift back and forth between two adjacent cams only for a particular state of the weather and like factors.

It is believed that the construction and operation as well as the many advantages of my improved multi-position regulator system will be apparent from the foregoing detailed description. A two-position thermostat or other indicator is used in a very simple fashion to obtain multiple positions of adjustment of a furnace or other corrective agency. Various numbers of intermediate positions may be used, for example, one, two, or even an indefinitely large number, as in the self-adjusting arrangement which seeks to automatically obtain exact equilibrium in the system between the heat supplied and the heat lost. The intermediate adjustments may regulate by time interval as well as by position of adjustment. The desired intermediate adjustment is established the moment the thermostat leaves the high or low contact and long before it is changed all the way to the opposite end of the thermostat differential. In this manner the operational change needed in the system is anticipated, thereby minimizing the exaggerated hunting usually caused by the great inertia of a heating system. However, the anticipation which I obtain is not arbitrarily based on time alone or some similar single factor, but rather is itself based on a true temperature measurement detected by the thermostat or equivalent control instrument. The degree of partial correction most suitable for the intermediate adjustments may of course be empirically determined and may vary in different geographic localities and for different types of heating systems. Of course, the over-all range of adjustment produced by the regulator system is itself subject to change, for example, how far open the damper system is actually moved in the so-called "open" position, etc.

It will also be apparent that while I have shown and described my invention in several preferred forms, many additional changes and modifications may be made in the structures disclosed, without departing from the spirit of the invention defined in the following claims.

I claim:

1. A regulator system comprising a control instrument responsive to a condition to be regulated and having contacts marking desired upper and lower limits, corrective apparatus including motor means for varying the condition, a switch for controlling the motor, cam means connected to said corrective apparatus for so opening or closing the switch as to bring the corrective apparatus to a desired position, a multi-position relay connected between said control instrument and said cam means for establishing any one of multiple desired positions of the corrective apparatus, means to move said relay to either extreme position in response to contact at the control instrument, and additional means to restore said relay to an intermediate position when the control instrument leaves its limiting contact.

2. A regulator system comprising a thermostat having contacts marking desired upper and lower temperature limits of a temperature to be regulated, corrective apparatus including motor means for varying the said temperature being regulated, a switch for controlling the motor, cam means connected to said corrective apparatus for so opening or closing the switch as to bring the corrective apparatus to a desired position, a multi-position relay connected between said thermostat and said cam means for establishing one of multiple desired positions of the corrective apparatus, means to move said relay to either extreme position in response to contact at the thermostat, and additional means to restore said relay to an intermediate position when the thermostat leaves its limiting contact.

3. A regulator system comprising a control instrument responsive to a condition to be regulated and having contacts marking upper and lower limits, corrective apparatus for varying the condition, and a four-position relay connected between said control instrument and said apparatus for establishing four positions of the apparatus, means to move said relay to either extreme position in response to contact at the control instrument, and additional means automatically operative when the control instrument leaves its limiting contact to restore the relay to one of the intermediate positions.

4. A regulator system comprising a thermostat having contacts marking upper and lower limits, apparatus including motor means for varying the temperature, and a four-position relay connected between said control instrument and said motor means for establishing four positions of the motor means, means to move said relay to either extreme position in response to contact at the thermostat, and additional means automatically operative when the control instrument leaves its limiting contact to restore said relay to that intermediate position nearest the extreme position last used.

5. A regulator system comprising a thermostat having contacts marking upper and lower limits, heating apparatus for varying the heat supply, and a four-position relay connected between said control instrument and said apparatus for establishing four positions of the apparatus, electrically operated means to move said relay to either extreme position in response to contact at the thermostat, and resilient means to automatically restore said relay to that intermediate position nearest the extreme position last used.

6. A regulator system comprising a control instrument responsive to a condition to be regulated and having contacts marking desired upper and lower limits, corrective apparatus for varying the condition, and a multi-position relay connected between said control instrument and said apparatus for establishing a desired position of the apparatus, said relay comprising a pair of solenoids each connected to one of said contacts, a core movable thereby to either extreme position, a switch block moved by said core, a switch thereon connected to the apparatus, resilient means to automatically restore the switch block from either extreme position to an intermediate position, cam means cooperating with said switch upon relative movement of the switch block and cam means, and means connecting the apparatus to the cam means to so control the switch as to bring the apparatus to desired position.

7. A relay for a regulator system, said relay comprising a pair of solenoids, a core movable thereby to either extreme position, a switch block moved by said core with lost motion therebetween, a switch on said switch block, resilient means on opposite sides of said switch block to automatically restore the same from either extreme position to an adjacent intermediate position, and four cam means cooperating with said switch upon relative movement of the switch block and cam means.

8. A regulator system comprising a control instrument responsive to a condition to be regulated and having contacts marking upper and lower limits, corrective apparatus for varying the condition, and a four-position relay connected between said control instrument and said apparatus, for establishing four positions of the apparatus, said relay comprising a pair of solenoids each connected to one of said contacts, a core movable thereby to either extreme position, a switch block moved by said core with lost motion therebetween, a switch thereon connected to the apparatus, resilient means on opposite sides of said switch block to automatically restore the same from either extreme position to an adjacent intermediate position, and cam means cooperating with said switch upon relative movement of the switch block and cam means.

9. A regulator system comprising a thermostat having contacts marking desired upper and lower temperature limits of a temperature to be measured, apparatus including motor means for varying the said temperature being regulated, and a multi-position relay connected between said thermostat and said apparatus for establishing a desired position of the apparatus, said relay comprising a pair of solenoids each connected to one of said contacts, a core movable thereby to either extreme position, a switch block moved by said core, a switch thereon connected to the motor of the apparatus, resilient means to automatically restore the switch block from either extreme position to an intermediate position, cam means cooperating with said switch upon relative movement of the switch block and cam means, and means connecting the apparatus to the cam means to so control the switch as to bring the apparatus to desired position.

10. A regulator system comprising a thermostat having contacts marking upper and lower temperature limits, heating apparatus including motor means for varying the heat supply, and a four-position relay connected between said thermostat and said motor means for establishing four positions of the apparatus, said relay comprising a pair of solenoids each connected to one of said contacts, a core movable thereby to either extreme position, a switch block moved by said core with lost motion therebetween, a switch thereon connected in the motor circuit, resilient means on opposite sides of said switch block to automatically restore the same from either extreme position to an adjacent intermediate position, and cam means cooperating with said switch upon relative movement of the switch block and cam means.

11. A regulator system comprising a control instrument responsive to a condition to be regulated and having contacts marking upper and lower limits, corrective apparatus for varying the condition, and a multi-position relay connected between said control instrument and said apparatus for establishing the positions of the motor means, said relay comprising a pair of solenoids each connected to one of said contacts, a core movable thereby to either extreme position, a switch block moved by said core, a switch thereon connected to the apparatus, resilient means to restore the switch block from either extreme position to an intermediate position, cam means cooperating with said switch upon relative movement of the switch block and cam means, and means connecting the apparatus with the cam shaft so that the rotative position of the cams depends upon the corrective position of the apparatus.

12. A regulator system comprising a control instrument responsive to a condition to be regulated and having contacts marking upper and lower limits, corrective apparatus including motor means for varying the condition, and a four-position relay connected between said control instrument and said motor means for establishing four positions of the motor means, said relay comprising a pair of solenoids each connected to one of said contacts, a core movable thereby to either extreme position, a switch block moved by said core with lost motion therebetween, a switch thereon connected in the motor circuit, resilient means on opposite sides of said switch block to restore the same from either extreme position to an adjacent intermediate position, and cam means cooperating with said switch upon relative movement of the switch block and cam means, said cam means comprising four cams mounted on a shaft extending in the direction of movement of the switch block, and means connecting the motor with the cam shaft so that the rotative position of the cams depends upon the corrective position of the apparatus.

13. A regulator system comprising a thermostat having contacts marking upper and lower temperature limits, apparatus for varying the temperature, and a multi-position relay connected between said thermostat and said apparatus for establishing the corrective position of the apparatus, said relay comprising a reciprocable switch block, a switch thereon connected to the apparatus, means connected to said thermostat for moving the switch block to either extreme position, additional means to automatically restore the switch block from either extreme position to an intermediate position, cam means cooperating with said switch upon relative movement of the switch block and cam means, and means so connecting the apparatus with the cam means that the rotative position of the latter depends upon the corrective position of the former.

14. A regulator system comprising a thermostat having contacts marking upper and lower temperature limits, heating apparatus including motor means for varying the heat supply, and a four-position relay connected between said control instrument and said motor means for establishing four positions of the motor means, said relay comprising a pair of solenoids each connected to one of said contacts, a core movable thereby to either extreme position, a switch block moved by said core with lost motion therebetween, a switch thereon connected to the apparatus, resilient means on opposite sides of said switch block to restore the same from either extreme position to an adjacent intermediate position, and cam means cooperating with said switch upon relative movement of the switch block and cam means, said cam means comprising four cams mounted on a shaft extending in the direction of movement of the switch block, and means connecting the motor with the cam shaft so that the rotative position of the cams depends upon the position of the heating apparatus.

15. A regulator system comprising a control instrument responsive to a condition to be regulated and having contacts marking upper and lower limits, corrective apparatus including motor means for varying the condition, a relay connected between said control instrument and said motor means, means to move said relay to either extreme position in response to contact at the control instrument, means to restore the same from either extreme position to an intermediate position, and means to vary the effective intermediate position progressively in the direction of the extreme position last assumed.

16. A regulator system comprising a control instrument responsive to a condition to be regulated and having contacts marking upper and lower limits, corrective apparatus for varying the condition, a relay connected between said control instrument and said apparatus, said relay comprising a pair of solenoids each connected to one of said contacts, a core movable thereby to either extreme position, a switch block moved by said core, a switch thereon connected to the apparatus, resilient means to restore the same from either extreme position to an intermediate position, helical cam means cooperating with said switch upon relative movement of the switch block and cam means, means so connecting said cam to the apparatus that its rotative position is dependent on the corrective position of the apparatus, and means to move the switch block relative to the solenoid core in a direction toward the extreme position last assumed.

17. A regulator system comprising a control instrument responsive to a condition to be regulated and having contacts marking upper and lower limits, corrective apparatus for varying the condition, and a relay connected between said control instrument and said apparatus, said relay comprising a pair of solenoids each connected to one of said contacts, a rotatable core axially movable thereby to either extreme position, a switch block moved by said core, a switch thereon connected to the apparatus, resilient means to restore the same from either extreme position to an intermediate position, helical cam means cooperating with said switch upon relative movement of the switch block and cam means, said cam means being mounted on a shaft extending in the direction of movement of the switch block, means so connecting said shaft to the apparatus that its rotative position is dependent on the corrective position of the apparatus, and means to vary the position of the switch block relative to the solenoid core to a position intermediate the end positions last assumed, said means including gearing between the cam shaft and solenoid core, and a threaded connection between the switch block and solenoid core, said gearing being disengaged when the solenoid core is moved to either extreme position.

18. A regulator system comprising a simple two position control instrument responsive to a condition to be regulated and having contacts marking upper and lower limits, corrective apparatus for varying the condition, and a four-position relay connected between said control instrument and said apparatus, means to move said relay to either extreme position in response to contact at the control instrument, means to restore the same from either extreme position to an adjacent intermediate position, a switch moved by said relay and electrically connected to the apparatus, and cam mechanism cooperating with said switch, said cam mechanism comprising four cams having progressively increasing lift surfaces, and appropriate means for rotating the same slowly at a constant speed, whereby the switch is closed for time periods dependent upon the position of the switch with respect to the cams.

19. A regulator system comprising a simple two-position control instrument responsive to a condition to be regulated and having contacts marking upper and lower limits, corrective apparatus including motor means for varying the condition, and a four-position relay connected between said control instrument and said motor means, said relay comprising a pair of solenoids each connected to one of said contacts, a core movable thereby to either extreme position, a switch block moved by said core, a switch thereon electrically connected to said apparatus, resilient means to restore the same from either extreme position to an adjacent intermediate position, and cam mechanism cooperating with said switch upon relative movement of the switch block and cam means, said cam mechanism comprising four cams having progressively increasing lift surfaces, and appropriate means for rotating said cams slowly at a constant speed, whereby the switch on the switch block is closed for time periods dependent upon the position of the switch block with respect to the cams.

20. A regulator system comprising a control instrument responsive to a condition to be regulated and having contacts marking upper and lower limits, corrective apparatus for varying the condition, and a four-position relay connected between said control instrument and said apparatus, said relay comprising a pair of solenoids each connected to one of said contacts, a core movable thereby to either extreme position, a switch block moved by said core with lost motion therebetween, a switch thereon connected to said apparatus, resilient means on opposite sides of said switch block to restore the same from either extreme position to an adjacent intermediate position, and cam mechanism cooperating with said switch upon relative movement of the switch block and cam means, said cam mechanism comprising four cams mounted on a shaft extending in the direction of movement of the switch block, said cams having progressively increasing lift surfaces, and appropriate timing means for rotating said cam shaft slowly at a constant speed, whereby the switch on the switch block is closed for time periods dependent upon the position of the switch block with respect to the cams.

21. The combination in a regulator of a control instrument having two electrical contacts, a switch system and means for automatically actuating the same, a motor controlled by the switch system, the whole being arranged to control the setting of an apparatus for the purpose of tending to maintain the condition of a medium between the limits of the setting of the two electrical contacts of the control instrument, one contact actuating the apparatus to its limit in one direction and the other actuating the apparatus to its limit in the opposite direction, and means effective upon the opening of one or the other contact to automatically actuate the motor in a direction opposite to its previous travel and in a less amount by a predetermined percentage.

22. The combination in a regulator of a single two position control instrument set for a minimum and a maximum limit and sensitive to a change in the condition of a medium which is to be regulated, a motor actuated by the control instrument at the instrument's extreme setting respectively to a maximum or to a minimum limit for the purpose of applying a productive agency respectively at a maximum or at a minimum value and, when the change in value of the condition of the medium is such as to satisfy either setting of the control instrument, means for thereafter causing an abrupt corrective change in the amount of the productive agency to in turn cause a change in the condition of the medium tending to maintain the condition within the limits of the setting of the control instrument, the corrective factor being of one value in one predetermined direction and another predetermined value in the opposite direction of a change, whereby four different values of the productive agency are obtainable under the control of the aforesaid two position control instrument.

23. The combination in a regulator of a simple two position control instrument set for a minimum and a maximum limit and sensitive to a change in the condition of a medium which is to be regulated, a motor actuated by the control instrument to two positions for the purpose of applying a productive agency respectively at two values, said positions and values being one predetermined amount for one extreme setting of the control instrument and another predetermined amount for the other extreme setting of the control instrument, and means thereafter to actuate the motor to one predetermined intermediate position when the condition of the medium reaches a value just above the minimum setting of the control instrument after the minimum has been satisfied and to actuate the motor to another predetermined intermediate position when the condition of the medium reaches a value just below the maximum setting of the control instrument after the maximum has been satisfied.

24. The combination in a regulator of a simple two position control instrument set for a minimum and a maximum limit and sensitive to a change in the condition of a medium which is to be regulated, a motor controlling the application agency at a given value for two predetermined periods of time, said periods being one amount for one extreme setting of the control instrument and another amount for the other extreme setting of the control instrument, and means thereafter to effect one predetermined intermediate period of application of the productive agency when the condition of the medium reaches a value just above the minimum setting of the control instrument and to effect another predetermined intermediate period of application when the condition of the medium reaches a value just below the maximum setting of the control instrument.

25. A regulator system comprising a control instrument responsive to a condition to be regulated and having contacts marking desired upper and lower limits, corrective apparatus including motor means for varying the condition being regulated, a bodily movable switch for controlling the motor, a relay for bodily moving said switch, said relay being connected to said control instrument in such manner as to move said switch to either extreme position in response to contact at the control instrument, additional means to restore said relay to an intermediate position when the instrument leaves its limiting contact, a plurality of cam means into engagement with any one of which the switch is bodily moved by the relay, and means connecting said cam means to the corrective apparatus for so opening or closing the switch as to bring the motor means and corrective apparatus to desired position.

26. A regulator system comprising a thermostat having contacts marking desired upper and lower temperature limits of a temperature to be regulated, corrective apparatus including motor means for varying the said temperature being regulated, a bodily movable switch for controlling the motor, a relay for bodily moving said switch, said relay being connected to said thermostat in such manner as to move said switch to either extreme position in response to contact at the thermostat, additional means to restore said relay to intermediate position when the thermostat leaves its limiting contact, a plurality of cam means into engagement with any one of which the switch is bodily moved by the relay, and means connecting said cam means to the motor means for so opening or closing the switch as to bring the motor means to desired position.

LOUIS J. NEWMAN.